(12) United States Patent
Sato

(10) Patent No.: US 6,449,795 B1
(45) Date of Patent: Sep. 17, 2002

(54) CLEANING TOOL FOR OPTICAL FIBER CONNECTOR

(75) Inventor: Daisuke Sato, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/548,596

(22) Filed: Apr. 13, 2000

(30) Foreign Application Priority Data

Apr. 23, 1999 (JP) ............................................. 11-116811

(51) Int. Cl.[7] ............................ A47L 13/16; B08B 1/00
(52) U.S. Cl. ...................................... 15/210.1; 15/209.1
(58) Field of Search .......................... 15/208, 209.1, 15/210.1, 223, 225

(56) References Cited

U.S. PATENT DOCUMENTS

| | | | | | |
|---|---|---|---|---|---|
| 1,682,657 A | * | 8/1928 | Blank | ..................... | 15/209.1 X |
| 1,791,218 A | * | 2/1931 | Mallinckrodt | .............. | 15/210.1 |
| 2,233,831 A | * | 3/1941 | Burke | ........................ | 15/210.1 |
| 2,934,810 A | * | 5/1960 | Kanbar | ................... | 15/210.1 X |
| 4,065,801 A | * | 12/1977 | Leaming | ................. | 15/210.1 X |
| 5,214,821 A | * | 6/1993 | Burrow et al. | .............. | 15/210.1 |
| 5,809,806 A | * | 9/1998 | Yoon et al. | ............. | 15/209.1 X |
| 5,839,150 A | * | 11/1998 | Mikaoka | ..................... | 15/209.1 |
| 6,134,742 A | * | 10/2000 | Fernando et al. | ....... | 15/210.1 X |

FOREIGN PATENT DOCUMENTS

| | | | | |
|---|---|---|---|---|
| FR | 372914 | * 4/1902 | ................. | 15/209.1 |
| JP | 63-92319 | * 4/1988 | ................. | 15/209.1 |
| JP | 2-23922 | * 1/1990 | ................. | 15/209.1 |
| JP | 2-139449 | * 5/1990 | ................. | 15/209.1 |
| JP | 4-84925 | * 3/1992 | ................. | 15/209.1 |
| NO | 73552 | * 5/1948 | ................. | 15/210.1 |
| WO | 85/05296 | * 12/1985 | ................. | 15/210.1 |

* cited by examiner

*Primary Examiner*—Mark Spisich
(74) *Attorney, Agent, or Firm*—Rader, Fishman & Grauer, PLLC

(57) ABSTRACT

A cleaning tool for optical fiber connector composed of a bar form stem 1 and a support 2 thinner than the bar form stem 1 in thickness are made of resin integrally in series in the longitudinal direction, and the outside of this support 2 is covered with cleaning cloth 3 made of ultra fine filament bundle having a filament fiber size of 0.1-denier or less.

10 Claims, 3 Drawing Sheets

FIG.1(A')

CLEANING TOOL FOR OPTICAL FIBER CONNECTOR

BACKGROUND OF THE INVENTION

The present invention concerns a cleaning tool for optical fiber connector, and more particularly a cleaning tool for optical fiber connector appropriate for the connector of small diameter optical fiber for branching.

FIG. 6 shows an example of optical fiber connector 63 for connecting mutually ends of two optical fibers 60, 60. Respective optical fiber 60 is protected by being inserted in the core of a hollow cylindrical ferrule 61 in a way to expose a tip thereof from the end face of this ferrule 61. Moreover, the optical fiber connector 63 is composed to provide a cylindrical housing 64 inside, and to insert a metal split sleeve 65 in this housing 64.

For connecting mutually ends of two optical fibers 60, 60 using the optical fiber connector 63, first, the end of the ferrule 61 of one optical fiber 60 is inserted in one end of the split sleeve 65 of the optical fiber connector 63, then the end of the ferrule 61 of the other optical fiber 60 is inserted in the other end, to make end faces of both optical fibers 60, 60 and ferrules 61,61 into mutual close contact.

In general, the end faces of optical fiber 60 and ferrule 61 are cleaned in advance before insertion in to the optical fiber connector 63; moreover, as shown in FIG. 6, when one optical fiber 60 and ferrule 61 are inserted in one end (left end in FIG. 6) of the split sleeve 65 and, in this state, the other optical fiber 60 and ferrule 61 are inserted in the other end (right end in FIG. 6) of the split sleeve 65, the right hollow portion of the split sleeve 65 is cleaned necessarily before the insertion, and the end faces of the optical fiber 60 and the ferrule 61 already inserted in the left side and the inner wall surface of the hollow portion of the split sleeve 65 should be cleaned out.

If such cleaning is not performed and oil or dust is deposited on the end face of the optical fiber 60 or the ferrule 61, light may not be transmitted after the connection, or gap generation may cause connection loss or reflection loss. Besides, because oil or dust deposited on the inner wall surface of the split sleeve 65 may shift the optical axis of both optical fibers and provoke connection loss.

Conventionally, as a means for cleaning the split sleeve inner wall surface of the optical fiber connector, or the end face of the optical fiber and the ferrule further inside thereof as mentioned above, a cleaning tool as described in the Japanese Utility Model Publication No. 2530291 has been proposed. This cleaning tool composed by attaching an elastic element to the tip on a supporting seem, and covering the outside of this elastic element with ultra fine fabric cleaning cloth, cleans up something by introducing a cleaning portion of this cleaning cloth into the split sleeve and turning or moving reciprocating back and forth. The structure provided with elastic element is alleged to allow an effective application of the cleaning cloth surface to the ferrule end face, so as to clean up surely.

Though this cleaning tool is effective for cleaning an optical fiber connector for artery optical fiber of which ferrule outer diameter is 2.5 mm, the diameter of the supporting stem should be reduced to 1 mm or less in order to be used for the cleaning of the optical fiber connector for branch optical fiber in which the ferrule outer diameter is half, i.e. 1.25 mm. As a consequence, the reduction of the root side diameter of the supporting stem pinched by fingers to afford rotation or reciprocating motion also causes to deteriorate its rigidity, and to flex easily during the cleaning operation; so it can not afford rotation or reciprocating motion to the cleaning cloth side and the cleaning can not be performed completely.

As a countermeasure thereof, it has been proposed a cleaning tool wherein only an elastic element made of urethane or the like is attached to the tip of the supporting stem in place of using a cleaning cloth of said cleaning tool, to increase the outer diameter of the stem by the cleaning cloth thickness. However, the lack of this cleaning cloth makes the cleaning effect of this cleaning tool insufficient, and moreover, the elastic element deterioration produces powder dust.

Another cleaning tool without cleaning cloth is also proposed wherein the supporting stem is made as straw like tube, this straw like tube is filled with fiber, which is exposed at the tip. However, this cleaning tool is not practical, because it cleans only the tip of the optical fiber and the ferrule and can not clean the inner wall surface of the split sleeve.

SUMMARY OF THE INVENTION

Therefore, the object of the present invention is to provide a cleaning tool for optical fiber connector that can clean effectively, even if it is designed for an optical fiber connector of reduced inner diameter.

To attain said object, the cleaning tool for optical fiber connector of the present invention is characterized by that a bar form stem and a support thinner than the bar form stem in thickness are molded with resin integrally in series in the longitudinal direction, and the outside of said support is covered with cleaning cloth made of ultra fine filament bundle presenting the filament fiber size of 0.1 denier or less.

Thus, as only the support to be covered with cleaning cloth is made thinner, while the root to be pinched with fingers to afford rotational or reciprocating motion is kept thick as bar form stem, flexion or bending will not occur easily during the cleaning operation including rotational or reciprocating motion, exhibiting an excellent cleaning effect.

DETAILED DESCRIPTION OF THE PREFERRED EMBODIMENTS

Figure 1A:
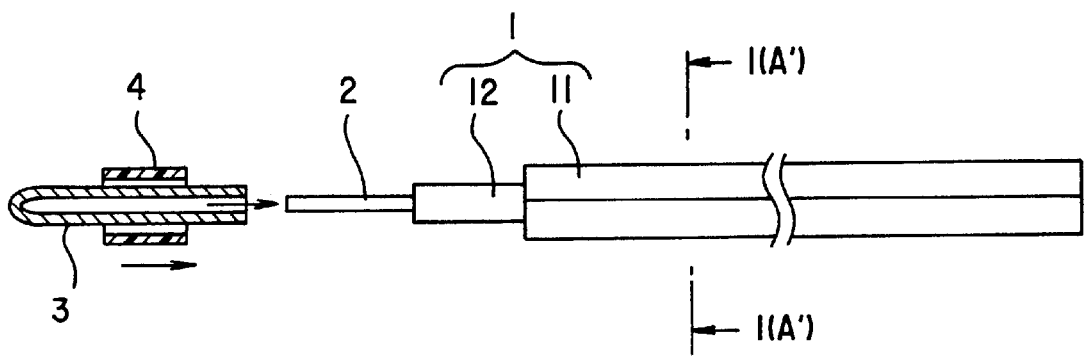
FIGS. 1(A), (B) and (C) are process diagrams illustrating the manufacturing process of a cleaning tool for optical fiber connector according to an embodiment of the present invention.
Figure 1A:
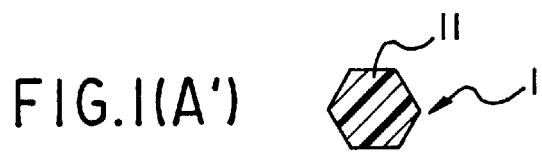
Figure 1B:
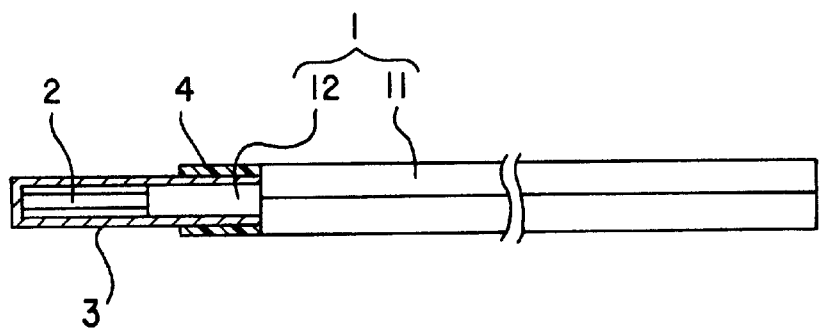
FIG. 1(A') is a section along the line 1(A')—1(A') in FIG. 1(A)
Figure 1C:
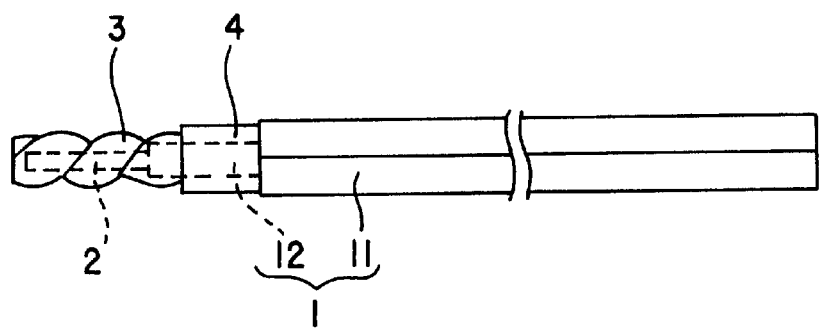
Figure 2:
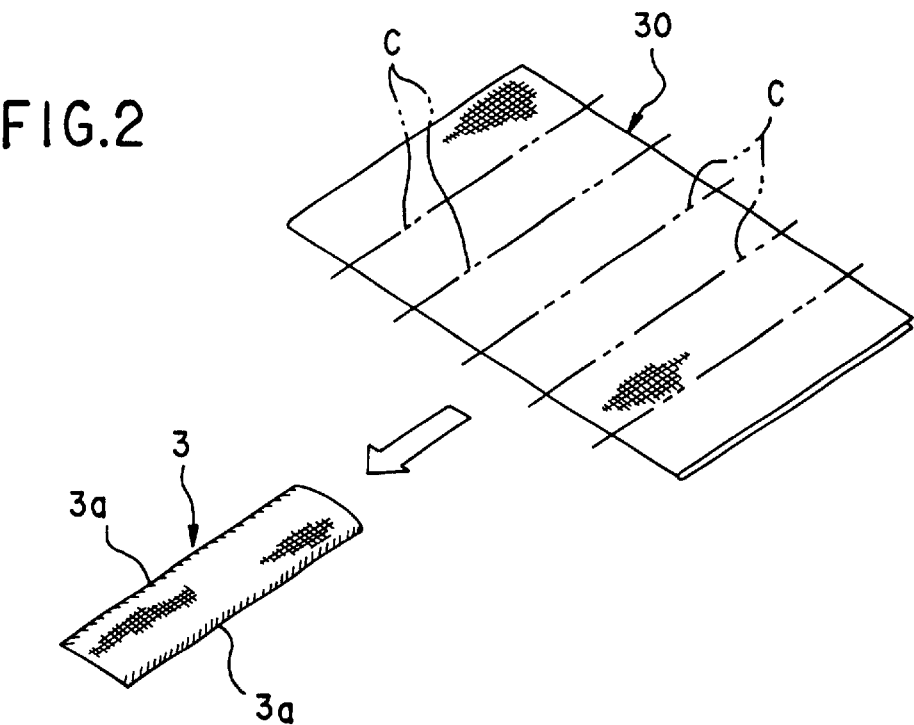
FIG. 2 is an illustrative drawing showing an example of method for processing a cleaning cloth used for the present invention into a bag form.

In FIGS. 1(A) to (C), FIG. 1(A) shows respective components of a cleaning tool for optical fiber connector in the separated state before the assembly, 1 being a bar form stem, 2 a support, 3 a cleaning cloth made of ultra fine filament bundle, and 4 a fixed tube made of heat shrinkable resin.

The bar form stem 1 and the support 2 are formed integrally from fiber reinforced resin so as to connect them in series in the longitudinal direction. Besides, the bar form stem 1 is formed into a stepped configuration made of a thick body 11 having a hexagonal cross-section and an auxiliary portion 12 having a circular cross-section smaller than this body 11 in thickness.

The outside of the support 2 is covered with a cleaning cloth 3 processed into a bag form as shown in FIG. 1(B), and moreover, the terminal end of the cleaning cloth 3 extends up to the auxiliary portion 12 of the bar form stem 1, the outer circumference of the terminal end thereof is covered with a fixed tube 4 of heat shrinkable resin, and then shrink-fixed by heat treatment. In this embodiment, when the fixed tube 4 is fixed by heat shrinking, a helical tortion bias is applied to the bag form cleaning cloth 3, for realizing a cleaning tool for optical fiber connector of the form shown in FIG. 1(C).

In this invention, the resin used for integral molding of the bar form stem 1 and the support 2 is not particularly limited. It is preferable that the resin flexural strength is equal or superior to 1300 kg/cm$^2$ to assure a sufficient cleaning by inserting into an optical fiber connector of small inner diameter. However, the flexural strength is preferably equal or inferior to 2800 kg/cm$^2$, because if the flexural strength is so high to break the cloth made of ultra fine filament bundle having a filament fiber size of 0.1-denier or less, the connector of small inner diameter can not be cleaned up. The flexural strength is preferably 1400 to 2700 kg/cm$^2$, and more preferably 1500 to 2600 kg/cm$^2$. Here, the flexural strength is the one determined according to ASTM D790.

Resins that can be used include polyamide, polyester, polyethylene, polypropylene or other thermoplastic resins. It is, preferable to fill these thermoplastic resins with glass fiber, carbon fiber or other reinforcing fiber to maintain the aforementioned flexural strength, even when the support 2 is made thinner. Especially, fiber reinforced resin made by the combination of polyamide resin and glass short fiber.

When the support 2 for holding the cleaning cloth 3 is molded from fiber reinforced resin, it can maintain enough rigidity and strength even when it is so small that its diameter is 1 mm or less, support the cleaning cloth 3 without deformation, and thus assure an excellent cleaning effect.

Moreover, it is preferable that the outer diameter of the support 2 is 1 mm or less in diameter, so that it can correspond to the cleaning of optical fiber connector for branch optical fiber whose ferrule outer diameter is 1.25 mm. Besides, it is preferable to form the body 11 of the bar form stem 1 into a polygonal cross-section, having its minimum cross-section width 2.5 mm or more. Thus, the cleaning operation including rotational or reciprocating motion of the cooling tool for optical fiber connector can be further improved, by making its cross-section polygonal and/or making its minimum cross-section width 2.5 mm or more.

The cleaning cloth used for the present invention is made of a cloth using ultra fine filament bundle having a filament fiber size of 0.1-denier or less. The filament fiber size is preferably 0.08-denier or less, or more preferably, 0.06-denier or less. Moreover, preferably, ultra fine filament bundle having filament fiber size of 0.1-denier or less is twisted, and plain fabrics using this twisted yarn as warp and/or weft may be used.

The twisting of ultra fine filament bundle affords softness to the cleaning cloth, allowing to apply the cleaning cloth to the ferrule end face, and thus to assure a complete cleaning. The cleaning cloth made of ultra fine filament bundle can capture ultra fine particles of oil or dust between filaments during wiping operation, exhibiting extremely high cleaning effect.

As a method for processing the cleaning cloth into a bag to cover the support, it can be processed more easily by cutting a cloth made of ultra fine filament bundle into a band shape piece, folding this band shape piece 30 into two, and cutting its top face into strips along the broken line C using a heat fusion cutter or an ultrasonic cutter.

Figure 3A:
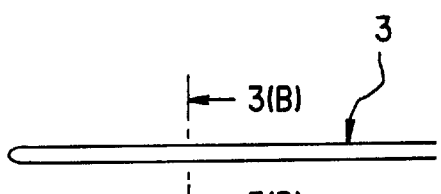
FIG. 3(A) is a longitudinal section of bag form cleaning cloth used for the present invention.
Figure 3B:
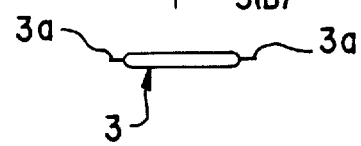
FIG. 3(B) is a section along the line 3(B)—3(B) in FIG. 3(A)
Figure 4A:
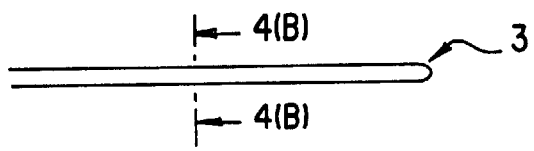
FIG. 4(A) is a longitudinal section of reversed bag form cleaning cloth of FIGS. 3(A), (B).
Figure 4B:
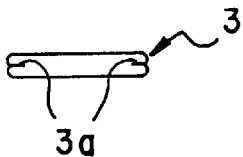
FIG. 4(B) is a section along the line 4(B)—4(B) in FIG. 4(A)

The cleaning cloth 3 fusion cut or ultrasonic cut and processed into a bag form as aforementioned has burr like fusion welded portions 3a, 3a formed at both edges as shown in FIG. 3(A), (B). Therefore, if the outside of the support 2 is to be covered, the cloth is advantageously reversed as shown in FIG. 4(A), (B), to fold burr like fusion welded portions 3a, 3a into the bag before covering. In other words, the burr like fusion welded portion 3a is made as film form, without cleaning function as itself; therefore, by reversing the bag surface to the back as mentioned above, the burr like fusion welded portion 3a can be concealed inside, and at the same time, a portion containing only ultra fine filament bundle can be exposed to the cleaning surface.

Figure 5:
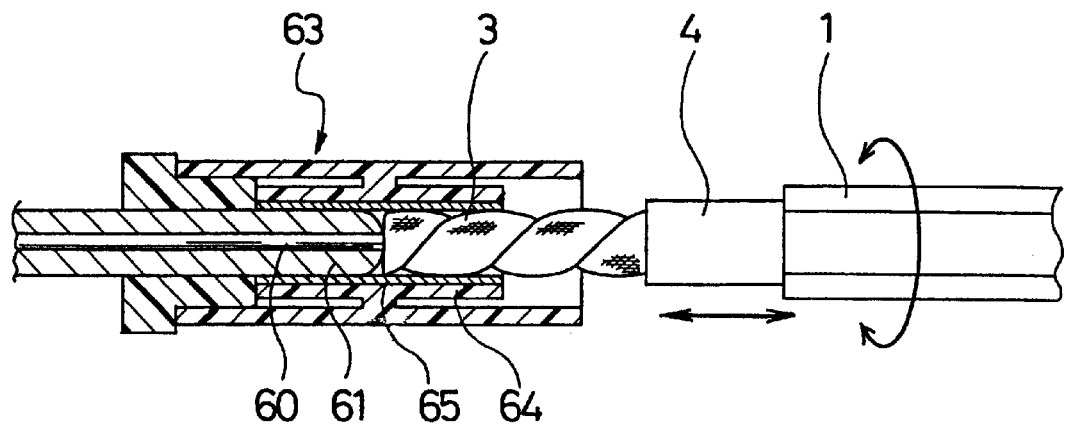
FIG. 5 is a longitudinal section showing the cleaning situation of an optical fiber connector by means of a cleaning tool for optical fiber connector of the present invention.
Figure 6:
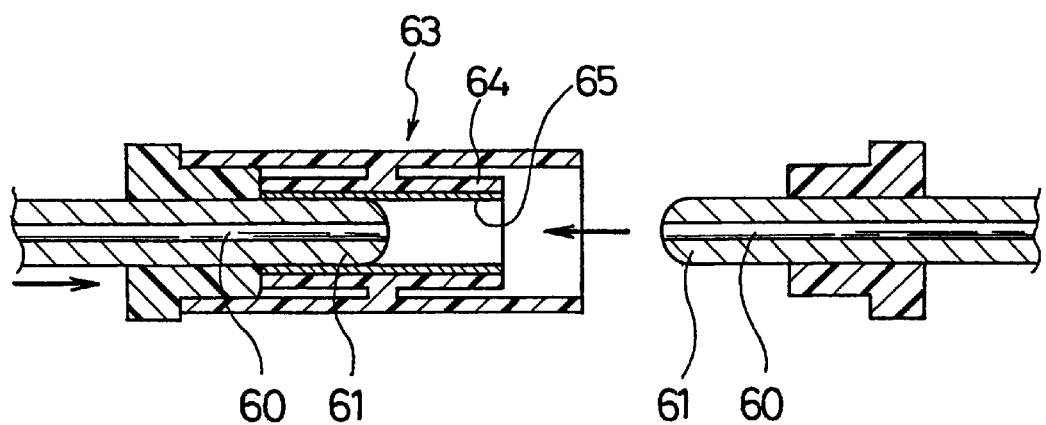
FIG. 6 is a longitudinal section showing an example for connecting two ferrule protected optical fibers with an optical fiber connector.

To clean an optical fiber connector using the aforementioned cleaning tool for optical fiber connector, as shown in FIG. 5, it is inserted into a split sleeve 65 opposite to the other side of an optical fiber connector 63 wherein a ferrule 61 holding an optical fiber 60 is inserted only into the one side, and the body 11 of the bar form stem 1 is pinched with fingers to afford rotational and reciprocating motion operation. This rotational and reciprocating motion operation allows the tip cleaning cloth 3 to clean up not only the end faces of the optical fiber 60 and the ferrule 61, but also the inner wall surface of the split sleeve 65.

Said cleaning tool for optical fiber connector can fix the cleaning cloth 3 securely so that it will not drop out from the support 2, exhibiting an excellent cleaning effect, as the terminal end of the cleaning cloth 3 is affixed on the bar form stem 1 (auxiliary portion 12) thicker than the support 2. Besides, as the bar form stem 1 is thicker than the support 2, it can be pinched easily by fingers, to afford enough friction force to facilitate the rotational and reciprocating motion operation. Especially, as illustrated in the drawing, if the thickest body 11 has a polygonal cross-section, the friction force increases to further improve the operation efficiency.

As mentioned above, according to the present invention, the bar form stem and the support thinner than the bar form stem are made of resin integrally in series in the longitudinal direction, and the outside of said support is covered with cleaning cloth made of ultra fine filament bundle having a filament fiber size of 0.1-denier or less, to make thinner only the support to be covered with cleaning cloth, and thicker the bar form stem to be pinched with fingers to afford rotational and reciprocating motion; therefore, an excellent cleaning effect can be assured without flexing or bending easily during the cleaning operation including rotational and reciprocating motion.

What is claimed is:

1. A cleaning tool for an optical fiber connector comprising:

a bar form stem and a support thinner than the bar form stem in thickness are made of resin integrally in series in a longitudinal direction, and an outside of said support is covered with cleaning cloth made of an ultra fine filament bundle having a filament fiber size of 0.1-denier or less, wherein:

said bar form stem is formed integrally from a body and an auxiliary portion having a uniform diameter, the auxiliary portion being thinner than the body in thickness, and a terminal end of said cloth is fixed to the auxiliary portion.

2. The cleaning tool for an optical fiber connector of claim 1, wherein:

the bending strength of said resin is 1300 to 2800 kg/cm$^2$.

3. The cleaning tool for an optical fiber connector of claim 1, wherein:

said resin is a fiber reinforced resin.

4. The cleaning tool for an optical fiber connector of claim 3, wherein:

said fiber reinforced resin is made of polyamide resin and glass short fiber.

5. The cleaning tool for an optical fiber connector of claim 1, wherein:

the diameter of said support is 1 mm or less.

6. The cleaning tool for an optical fiber connector of claim 1, wherein:

said body has a polygonal cross-section.

7. The cleaning tool for an optical fiber connector of claim 1 or 6, wherein:

the minimum cross-section width of said body is 2.5 mm or more.

8. The cleaning tool for an optical fiber connector of claim 6, wherein said body has a hexagonal cross-section.

9. The cleaning tool for an optical fiber connector of claim 1, wherein the body, the auxiliary portion and the support are formed as an integral construction with the auxiliary portion disposed between the body and the support, the body, the auxiliary portion and the support coextending along a common longitudinal axis.

10. A cleaning tool for an optical fiber connector, comprising:

a bar form stem including an elongated body having a substantially uniform cross-section and diameter and an elongated auxiliary portion integrally formed with and extending from an end of said elongated body, said auxiliary portion having a substantially uniform cross-section and a substantially uniform diameter less than the diameter of the elongated body;

an elongated support integrally formed with and extending from an end of the auxiliary portion, said support having a substantially uniform cross-section and a substantially uniform diameter less than the diameter of said auxiliary portion;

said elongated body, auxiliary portion and said support being axially aligned with each other and integrally formed of a resin material; and a cleaning cloth made of ultra-fine filaments having a filament size of 0.1 denier or less, said cleaning cloth covering said support and fixed to said auxiliary portion.

* * * * *